United States Patent [19]
Gebhard

[11] 3,990,186
[45] Nov. 9, 1976

[54] VENT WINDOW ASSEMBLIES

[75] Inventor: Paul C. Gebhard, Little Falls, N.J.

[73] Assignee: Young Windows Inc.,
Conshohocken, Pa.

[22] Filed: Nov. 12, 1975

[21] Appl. No.: 631,104

Related U.S. Application Data

[63] Continuation of Ser. No. 463,549, April 24, 1974, abandoned.

[52] U.S. Cl. ............................................... 49/393
[51] Int. Cl.² ......................................... E06B 7/22
[58] Field of Search ............ 49/390, 391, 393, 394; 16/140

[56] References Cited
UNITED STATES PATENTS

| | | | |
|---|---|---|---|
| 2,115,036 | 4/1938 | Morrison | 49/390 |
| 2,582,420 | 1/1952 | Ellis | 49/391 X |
| 2,698,958 | 1/1955 | Adams | 49/391 X |
| 2,761,184 | 9/1956 | Renno | 49/391 |

FOREIGN PATENTS OR APPLICATIONS

| | | | |
|---|---|---|---|
| 1,251,179 | 10/1963 | Germany | 16/140 |

*Primary Examiner*—Kenneth Downey
*Attorney, Agent, or Firm*—Frederick J. Olsson

[57] ABSTRACT

A vent window assembly having a seal with both side and edge sealing surfaces; pivot means support the glass and are spaced away from the opening so that no part pierces the seal which allows the seal to be an extruded piece continuous in the opening; the construction of the pivot means provided for the same to be used as a lock to hold the glass in the closed or in any open position or used as a clutch as by holding the glass in an open position but permitting the glass to yield upon impact.

4 Claims, 11 Drawing Figures

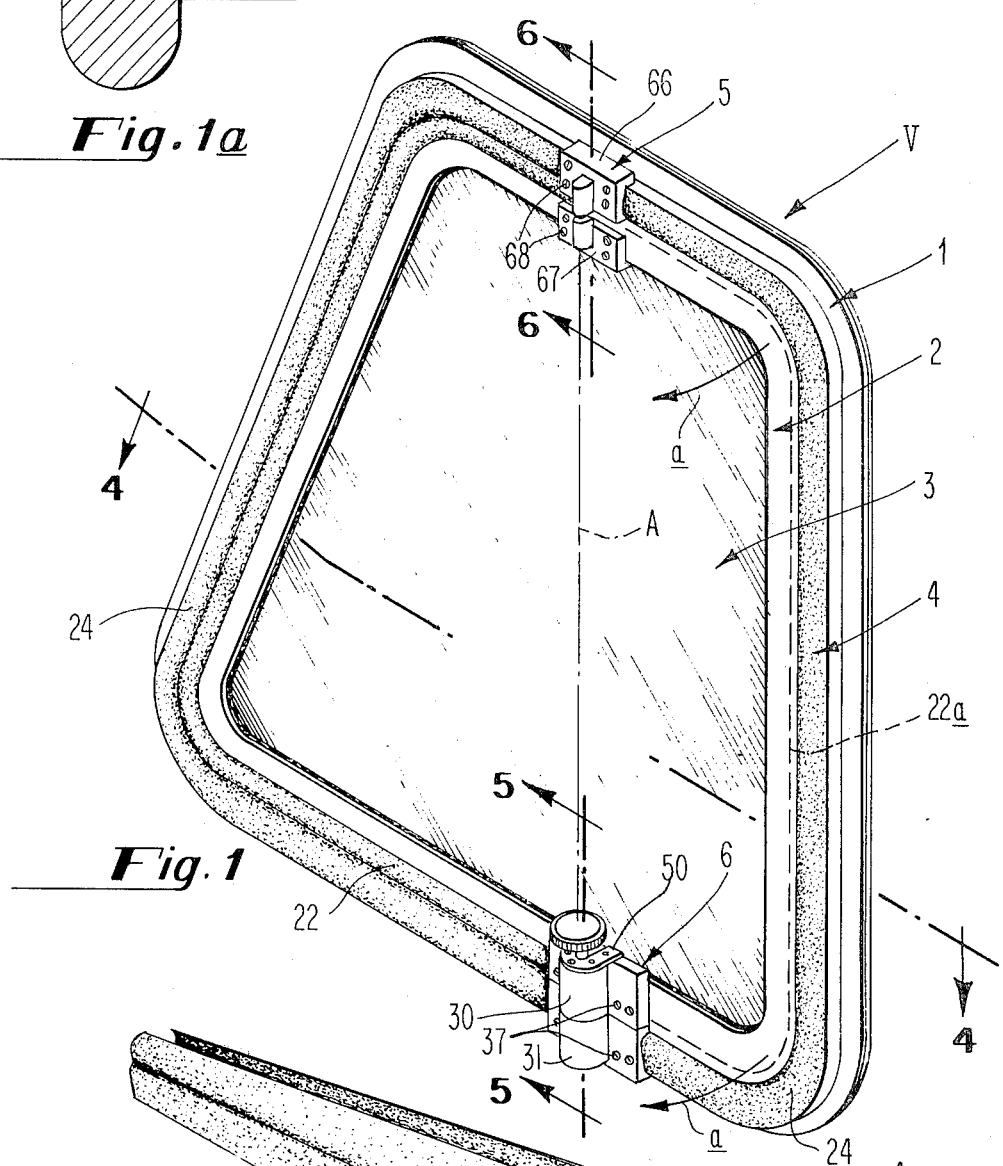
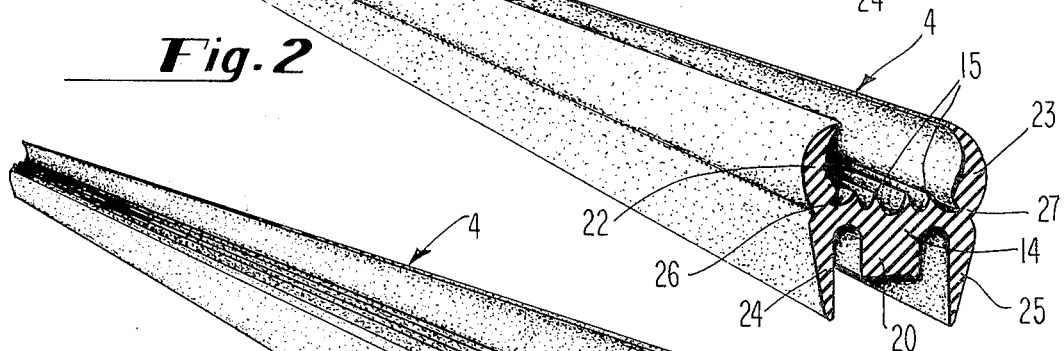
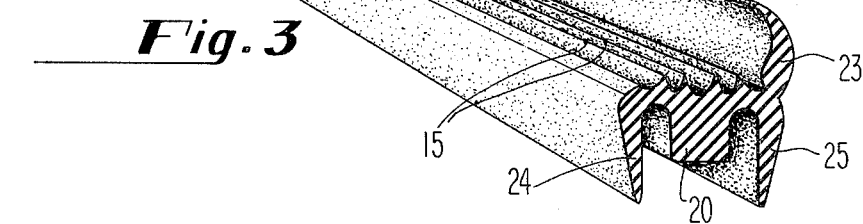

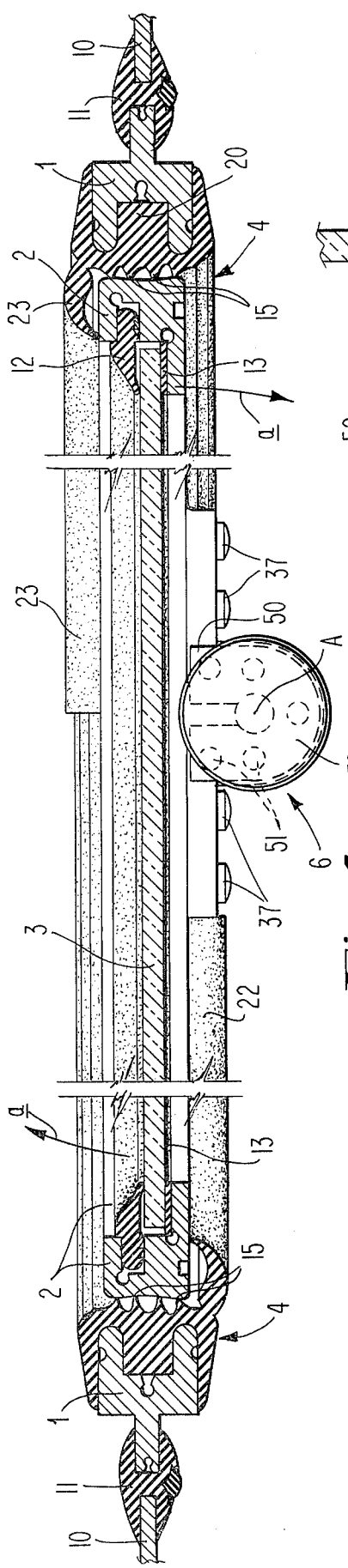
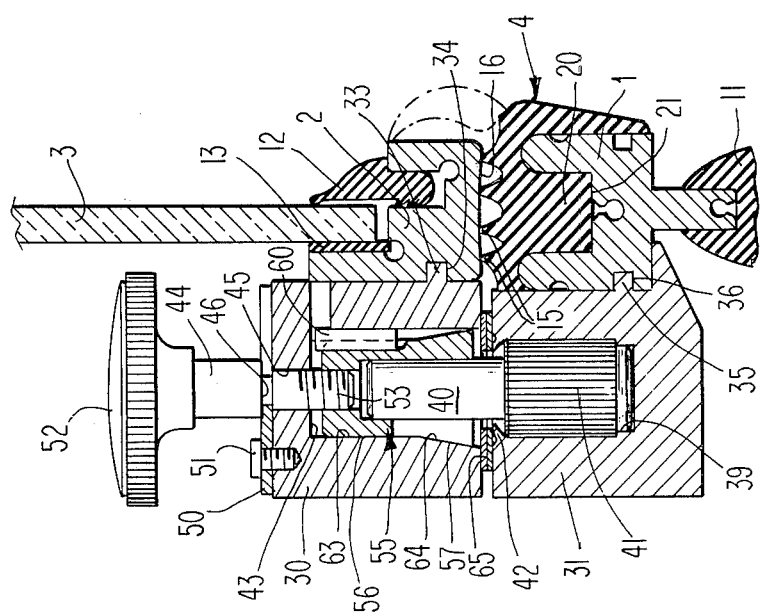
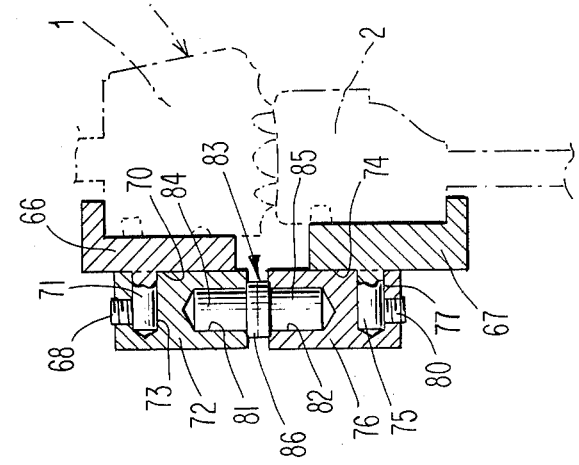
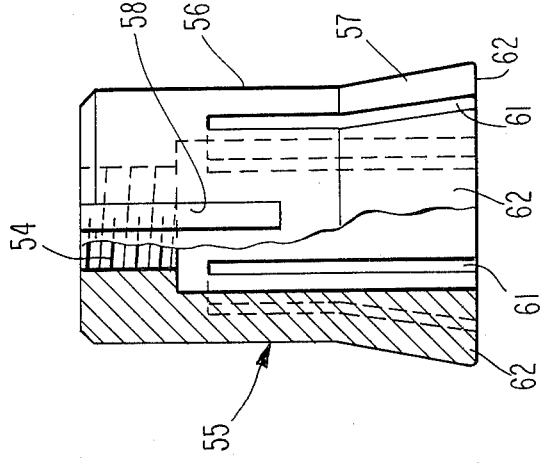

VENT WINDOW ASSEMBLIES

This application is a continuation of my co-pending application Ser. No. 463,549 filed Apr. 24, 1974.

This invention relates to an improved vent window assembly for use in marine equipment, mobile and recreational vehicles, trucks, tractors, construction equipment and other like carriers or vehicles.

One object of the invention is to provide a seal for a vent window assembly which has both edge and side sealing surfaces.

Another object of the invention is to provide a seal for a vent window assembly which is made by extrusion and which has edge and side sealing surfaces constructed so that portions of the side seals can be peeled away to provide clearance for rotation of the glass.

Another object of the invention is to provide a seal of the kind in question having a plurality of ribs which firmly engage the outer edge of the glass frame to form an edge seal in the closed position.

Another object of the invention is to provide a seal of the kind mentioned wherein the locus of the extremeties of the ribs can be in-line, convex or concave and the glass or frame can have a matching or dissimilar surface on its edge.

Another object of the invention is to privide in a vent window assembly pivot means for supporting the glass for rotation as between closed and open positions together with a seal for sealing the glass in closed position, the pivot means being constructed and arranged to permit the seal to be an extruded, single, continuous piece extending around the glass opening.

Another object of the invention is to provide in a vent window assembly, pivot means supporting the glass piece for rotation as between open and closed positions, the pivot means being constructed and arranged so that no part of the pivot means pierces the seal whereby the seal is a single, continuous piece extending around the glass opening.

Another object of the invention is to provide in a vent window assembly pivot means for supporting the glass for rotation as between open and closed positions which is operable to lock the glass in a closed position and in any of a plurality of open positions.

Another object of the invention is to provide in a vent window assembly pivot means for supporting the glass for rotation as between closed and open positions and which is operable alternatively to lock the glass in any of a plurality of open positions or to secure the glass in any open position in a manner so that it will yield upon an impact on the glass.

Another object of the invention is to provide in a vent window assembly a pair of pivots arranged one over the other on opposite sides of the glass which are constructed and arranged so that the pair are reversible in position.

Another object of the invention is to provide in a vent window assembly, a pair of pivots which can support the glass for rotation about a vertical axis or about a horizontal axis.

The invention will be described below in conjunction with the following drawings wherein:

FIG. 1 is a perspective view of a vent window assembly constructed in accordance with the invention;

FIG. 1a is a sectional view of an extruded blank for making components of the assembly of FIG. 1:

FIG. 2 is a perspective view of a seal member for use in the assembly of FIG. 1;

FIG. 3 is a perspective view of the seal of FIG. 1 with one of the side seal peeled away;

FIG. 4 is a plan view taken along the lines 4—4 of FIG. 1;

FIG. 5 is a view taken along the lines 5—5 of FIG. 1;

FIG. 6 is a view taken along the lines 6—6 of FIG. 1;

FIG. 7 is a fragmentary view of a collet used in the assembly shown in FIG. 5;

Figure 8:
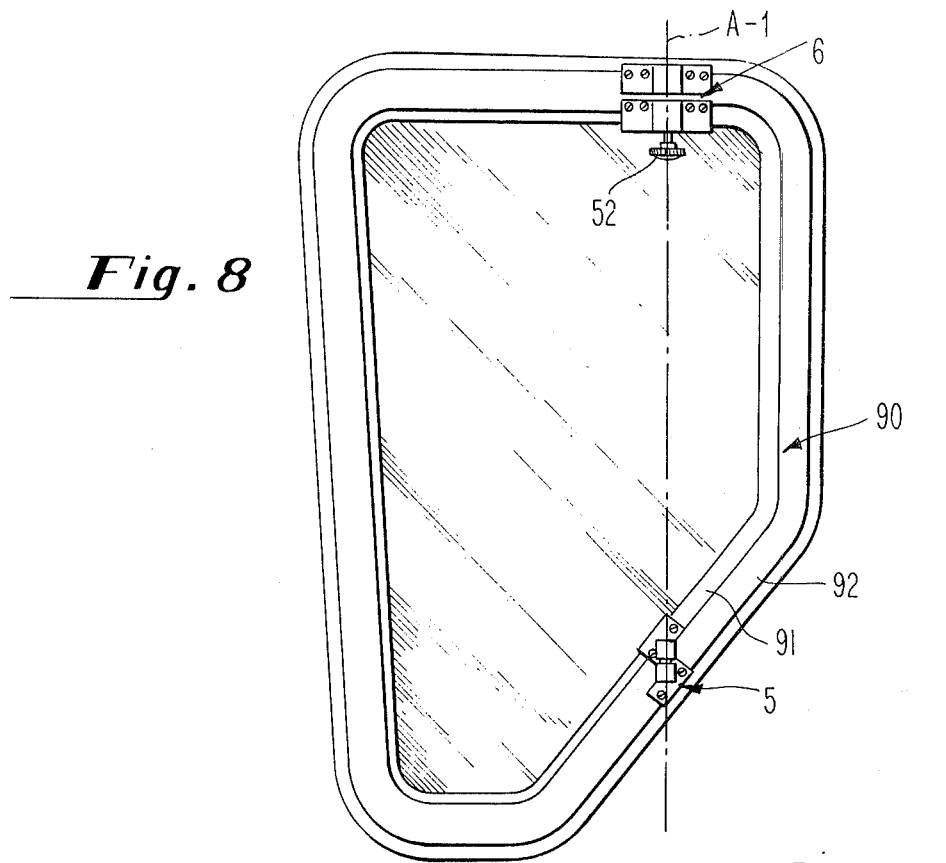
FIG. 8 is an elevational view of a vent window assembly constructed in accordance with the invention.

In FIG. 1, the vent assemly V includes the outer frame 1, the inner frame 2, the glass 3, the seal 4 and the pivots 5 and 6.

The outer frame is made in a closed, annular generally planar form and has a U-shaped cross-section as noted in FIGS. 4 and 5. The outer frame is supported in the body 10 of the vehicle by the mount 11. The seal 4 extends around the opening formed by the annular shape of the outer frame. The inner frame is nested within the opening formed by the seal.

Likewise, the inner frame 2 is in a closed, annular, generally planar form and has an L-shaped cross-section as shown in FIGS. 4 and 5. The inner frame mounts a contoured glass piece as by the seals 12 and 13.

The inner and outer frames are cut from extruded stock and bent into the desired shape. The abutting edges are perferably joined together by fasteners or tie-bars shown in my co-pending application Ser. No. 358,284 filed May 8, 1973 and entitled BUTT JOINTS.

The pivots 5 and 6 mount the inner frame on the outer frame for rotation between the closed position as shown in FIGS. 1 and 4 to any of a plurality of open positions. The pivots support the inner frame so that rotation takes place about the axis A.

As viewed in FIGS. 1 and 4, the inner frame and glass are rotated clockwise (arrows a) to an open position and in the opposite direction to the closed position.

Referring to FIG. 1, when the inner frame and glass are in an open position, the glass and inner frame on the right side of the axis A are on the viewable side of the outer frame while the inner frame and glass on the left side of the axis A are on the hidden side of the outer frame. As will be explained later, the pivot mechanism 6 can be used to lock the inner frame in the closed position or in any open position and also can be adjusted so that a clutch effect can take place in any open position.

Seal 4 is an important part of the invention. Each seal is cut to size from an extruded length. The use of an extrusion provides for a significant reduction in manufacturing costs. Moreover, the seal is assembled on the frame simply by pressing into the opening of the outer frame and sucuring in any conventional way. This reduces assembly costs. Because of the pivot structure, the seal is continuous around the opening and this feature greatly enhances the sealing effectiveness. Lastly, the seal is constructed for both edge and side sealing and this dual action further enhances sealing efficiency.

Referring to FIG. 2 the seal has an elongated body made of waterproof, flexible material such as synthetic rubber. The body has a generally flat base 14 which is co-extensive therewith. A plurality of ribs are formed on one side or surface of the base and are also co-extensive with the base. In the embodiment shown, the two center ribs extend outwardly further than the two outboard ribs. The locus of the extremeties of the ribs is a surface dished or concave with respect to the rib surface. The ribs are adapted to engage the seal surface or outer edge 16 (FIG. 5) of the inner frame 2 to make an edge seal. In this instance, the outer edge 16 has a dished or concave contour so as to fit the contour of the ribs. The contoured structure has some detenting effect. It will be understood that the edge seal may comprise in-line, concave and convex surfaces or combinations thereof. On the opposite surface of the base there is a support leg 20 which is disposed in the slot 21. The abutting edges of the seal are preferable cemented to maintain the continuity of the seal. One conventional way of securing the seal is by cementing.

The seal also includes a pair of inner sides 22 and 23 which are respectively formed on opposite edges of the base and extend outwardly in the same direction as the ribs 15. The sides 22 and 23 form a channel with the ribs being disposed at the bottom of the same. The sides 22 and 23 are for use in engaging the sides of the outer frame to form side seals.

A pair of outer sides 24 and 25 are formed on the base edge and extend outwardly from the base in the same direction as the support leg 20. The sides 24 and 25 from a channel with the support leg within the same. The sides 24 and 25 are adapted to tightly engage the sides of the outer frame 1.

It is to be noted that the leg 20 can be fully inserted in the slot 21 or occupy a position wherein it is not fully inserted. The exact position depends upon the nature of the assembly. This adjustability feature is highly desirable and is provided by the design.

When the seal is installed in the outer frame, portions of the inner and outer sides (but not the base) are removed so as to accommodate the pivots 5 and 6 and, also, to provide clearance for the glass and inner frame to move between the open and closed positions. This is accomplished as follows.

The joinder area 26 between the base 14 and the inner side 22 has a reduced cross-section. The joinder area 27 between the base 14 and the inner side 23 also has a reduced cross-section. This permits portions of the side 22 or the side 23 to be peeled away from the base. For example, if the joinder area 26 is snipped or slightly cut and an upward tension force is applied to the side 22, the same will separate from the base. A section of the seal without inner side 22 is shown in FIG. 3.

The foregoing construction provides a very simple and effective means for removing portions to provide clearance for rotation of the inner frame.

With reference to FIGS. 1 and 4 a portion of the leg 22 on the right hand side of the axis A is removed. The dotted lines 22a represent a portion of the side removed. This provides clearance for motion of the glass and inner frame disposed to the right side of the axis A. On the left hand side, a portion of the side 23 is also removed (see FIG. 4) and this provides clearance for motion of the glass and inner frame disposed to the left side of the axis A.

With respect to the pivots 5 and 6 small sections of the side 24 are severed to allow the pivots to be installed.

It will be understood that when the above described portions of the sides 22, 23 and 24 are removed no portion of the base 14 or ribs 15 are removed so the base and ribs make a continuous run around the opening.

The pivot mechanisms 5 and 6 are important part of the invention. As indicated previously, the pivots are constructed and arranged in a manner which provides for the seal 4 to be continuous around the opening. The pivot 6 is provided with a lock-clutch mechanism which permits the glass to be locked in the closed position or alternatively to function as a clutch to allow the glass and inner frame, when in an open position, to yield in case of impact. The pivots can be used alternatively on the top or bottom of the assembly and with certain modifications can be used on angled portions of the frame with the rotational axis of the glass extending vertically. Moreover, the pivots can be used on the sides of an assembly so that the rotational axis of the glass extends horizontally.

The details of construction of the pivot 6 will be first explained.

The upper housing 30 is connected to the side of inner frame 2 and the lower housing 31 is connected to the side of outer frame 1. The housings 30 and 31 are identical in cross-section and are made from extruded stock the cross-sectional shape of which is indicated in FIG. 1a. Blanks are cut from the stock and then machined to provide for connection to the frame and for the pivot-lock-clutch mechanism as will be described below.

The housing 30 is formed with a key 33 which fits into a keyway 34 on the inner frame and the housing 31 has a key 35 which fits into the keyway 36. The keys and keyways and the screws 37 hold the housings in position.

The housing 31 is a bore 39. A stud 40 is driven into the bore 39 so that the splines 41 cut into the wall of the bore. The end of the bore is coined over as indicated at 42. The housing 30 has a bore or cavity 43. The stud 40 extends up into the cavity 43. The axes of the stud 40, bore 39 and cavity 43 are co-axial with the axis A.

A control screw 44 extends thru opening 45 in the housing 30. The screw makes a snug, sliding fit with the opening. The screw has a peripheral slot 46 which receives the U-shaped retainer 50. The retainer is held to the housing as by the screws 51. The retainer allows the screw 44 to rotate but prevents axial motion. On the top of the screw is an operating knob 52 and on the lower end are the threads 53.

The threads 53 mate with the threads 54 on a collet 55. As best noted in FIG. 7, the collet has a cylindrical section 56 and a frustro-conical section 57. The cylindrical section has a keyway 58 which receives the key 60. The key permits axial motion of the collet but prevents rotational motion. The frustor-concial sections 57 and part of the cylindrical sections 56 are slotted as by the slots 61 so as to form a plurality of flexible legs 62.

The cavity 43 has a cylindrical section 63 against which the cylindrical seciton 56 makes a snug, sliding fit. The cavity also has a frustro-conical surface 64 which is identical in shape to the surface 57.

Between the housings 30 and 31 are Belleville springs 65. The spring permit the housing 30 to rotate relative to the housing 31 and will transmit thrust as between the housings. The springs also take up any play between the housings.

The functioning of the pivot mechanism 6 will be noted below but first the structural details of the pivot mechanism 5 will be described.

A housing 66 is mounted on the side of outer frame 1 and a housing 67 is mounted on the side of inner frame 2. Both housings are L-shaped in cross-section and are held in position by the screws 68.

The housing 66 has a slide surface 70 and an alignment stud 71 projects outwardly from the surface. A pivot block 72 slidably engages the slide surface and has an alignment cavity 73 which receives the alignment stud 71. The stud makes a snug, sliding fit with the cavity. A set screw 68 is threaded within the block.

The housing 67 has a slide surface 74 and an alignment stud 75. The pivot block 76 slidably engages the slide surface 74 and has an alignment cavity 77 which receives the pivot stud 75. A set screw 80 in the block 76 bears on the stud 75.

When the set screws 68 and 80 are loose the blocks can be rotated or adjusted over the slide surfaces. When the set screws are tightened up the blocks are held in fixed position. The reason for this structure will be commented on later.

The pivot block 72 is provided with a pivot cavity 81 and the pivot block 76 is provided with a pivot cavity 82. A pivot stud 83 has a pair of end sections 84 and 85 which respectively extend into the cavities 81 and 82. The axis of stud 83 and the axes of cavities 81 and 82 are co-axial with axis A.

The washers 86 encircle the pivot stud and are disposed between the pivot blocks and function to transfer thrust as between the pivot blocks which permitting relative rotation of the blocks about the pivot axis.

When the pivot mechanisms 5 and 6 are mounted on the frames the axis A is co-axial with the axis of the stud 40 and the control screw 44 and with the axis of the pivot 83. The pivot 6 transfers the weight of the inner frame and glass to the outer frame. The thrust path is through the housing 30, through the Belleville spring 65 through the housing 31 and into the outer frame 1.

The fit between the control screw 44 and the housing 30 and the fit between the housing 30 and the collet 55 and between the collet and the stud 40 prevents transverse motion of the frames relative to the axis A. With respect to the top pivot 5 the fit between the pivot 83 and the cavities 81 and 82 also prevents transverse motion of the frames transverse the axis A. Thus, the foregoing parts comprise true pivot means which permits rotation of the inner frame and glass with respect to the outer frame without transverse motion.

As mentioned above, the pivot 6 can be operated altermatively as a lock or clutch. The manner in which this is done will be explained below.

Assume that the inner frame and glass are in the closed position as shown in FIG. 5, rotation of the knob 52 to the right will cause the threads 53 to tend to move the collet 55 upwardly. The frustro-conical surfaces 57 of the flexible legs 62 will engage the frustro-conical surface 64 on the cavity 43 and the engagement will cause the flexible legs to bear radially inwardly against the stud 40. Inasmuch as the stud is fixed against rotation, the foregoing engagement will prevent rotation of the inner frame and glass. Thus the pivot functions as a lock when the knob 52 is appropriately turned.

On the other hand, if the knob 52 is rotated to the left as viewed in FIG. 5, the collet will move downwardly to break the tight engagement and the inner frame and glass can be freely turned.

The knob 52 can be turned to a position as between the extremes of lock and no lock so that the fingers 62 exert a force as between the housing 30 and the stud 40 such that a sufficient impact on the inner frame and glass will overcome the holding force and the inner frame and glass will yield or rotate. The pivot then functions as a clutch.

This feature is important particularly where the vent window is used on the cabs of construction equipment or on the cabs of trucks where the window, during the operation to the equipment or truck, may be struck by another piece of construction equipment or a pole of the like. Instead of the vent window assembly being crushed or damaged from the impact, it will yield or move.

In some applications, it is desirable that the pivots 5 and 6 be reversed in position, that is to say that the pivot 5 be located on the bottom of the assembly and the pivot 6 located on the top. When this is done it is perferable that the pivot 6 is arranged so that the control knob 52 points downwardly (for example, see FIG. 8). In the top location the pivot mechanism 6 maintains the inner frame against motion in a direction transverse the axis A. Insofar as the lock-clutch operation is concerned, the pivot mechanims 6 operates exactly in the manner as described above. When the pivot 5 occupies the bottom position it transfers the weight of the glass and inner frame to the outer frame. The transfer path is via the housing 67, alignment stud 75, pivot block 76, washers 86, pivot block 72, stud 71, housing 66 into the outer frame 1.

Not only are the pivots reversible in position but in addition, may be used on angled rather than horizontal sections of the frames. This is noted following.

With reference to FIG. 8 it will be seen that in the vent window assembly 90, the pivot mechanism 5 occupies the bottom position on angled sections of the inner and outer frames 91 and 92. The structrue of the pivot mechanism 5 provides for it to be adjusted to accommodate this location as noted following. The set screws 68 and 80 are loosened so that the pivot blocks 72 and 76 can be adjusted on the slide surfaces whereby the axis of the pivot 83 is co-axial with the axis A-1. The set screws are then tightened to lock the pivot blocks in position.

Figure 9:
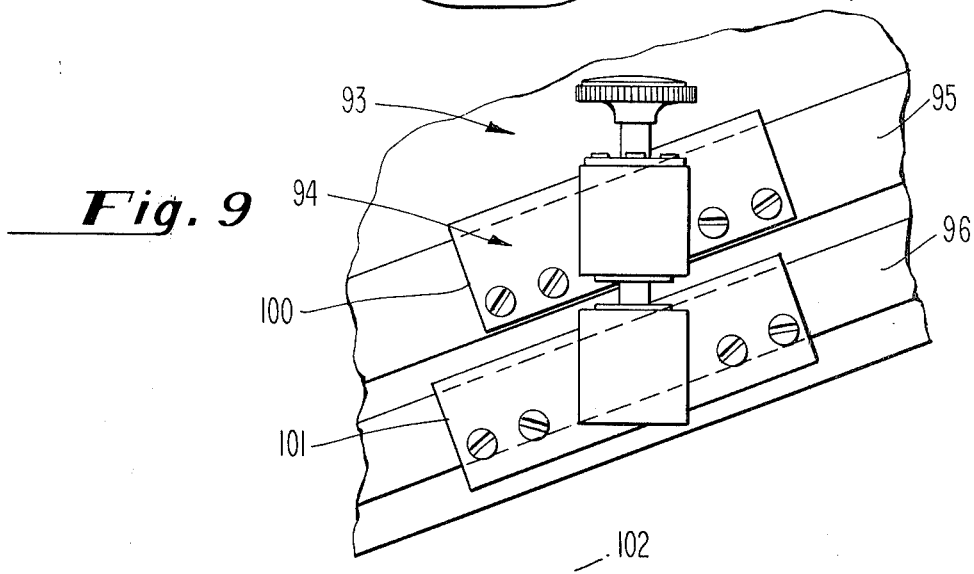
FIG. 9 is a fragmentary elevational view illustrating the adaptability of the pivot mechanism to different types of frames.
Figure 10:
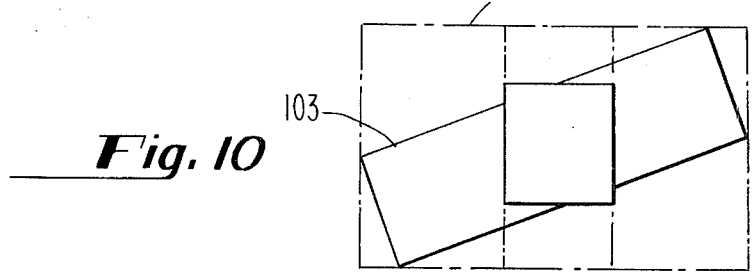
FIG. 10 is a plan view illustrating the manner of making certain components of FIG. 9.

With reference to FIG. 9, it will be noted that in the vent window assembly 93 the pivot mechanism 94 occupies a position on the angled sections of the inner and outer frames 95 and 96. The pivot mechanism 94 is the same as the pivot mechanism 6 but modified to provide for the angled location. The housings 100 and 101 of pivot mechanism 94 can be formed simply by cutting a section such as the section 102 (FIG. 10) from the same extrusion as the housings 30 and 31 are cut and then machining the section to the shape shown by the full lines 103. In very high volume, the housings 100 and 101 can be made of metal or plastic by conventional die casting processes.

While I have not illustrated in the drawings, it will be readily apparent that the pivots 5 and 6 can be mounted on vertically extending sides of a vent window assembly so that the rotational axis of the glass extends horizontally. Moreover, it is to be noted that the pivots can be used on the outside as well as the inside of the body of the vehicle or carrier.

Before closing, it is desired to point out certain modifications of the inner frame and the seal for purposes of cost and application.

The inner frame may comprise a pair of small sections, the main function of which is to connect the housings of the pivots 5 and 6 with the glass. In such instances, the outer edge of the glass is the sealing surface for the ribs 15. Furthermore, the seal may be constructed in two parts. One part being disposed on the peripheral edge of the glass (without a complete peripheral frame) and carrying the ribs 15 while the other part is on the outer frame and carries the sides 22, 23, 24 and 25. The sealing surface for the ribs is on the base between the sides 22 and 23 (in the same position as shown for the ribs in FIG. 5).

I claim:
1. A vent window assembly comprising;
   a closed, annular-shaped outer frame having means for mounting the assembly in the body of the vehicle, the annular shape forming an opening;
   continuous seal means made of resilient material disposed within and extending around the opening, the seal being connected to the outer frame;
   an annular shaped inner frame disposed within said opening with the outer periphery of the inner frame engaging said seal means and the inner frame mounting a window;
   first and second pivot means one disposed above the other and respectively connected between the inner and outer frames on the sides thereof and mounting the inner frame on the outer frame for rotation about a generally vertical axis as between open and closed positions, the rotational axis being laterally spaced from said seal means;
   a control knob rotatably mounted on one of said pivot means and laterally spaced from said frames and seal means whereby to be freely accessible to the vehicle operator for manual rotation thereby to control rotation of the inner frame;
   said first pivot means comprising an upper housing connected to the side of one of the frames and a lower housing connected to the side of the other frame and disposed directly below the upper housing, a pair of cavities respectively formed in the upper and lower housings with the axes of the cavities being co-axial with each other and with said rotational axis, a pivot stud disposed in and extending between said cavities and co-axial therewith and said housings and said stud being relatively rotatable about said rotational axis;
   said second pivot means comprising a second upper housing connected to the side of said other frame and a second lower housing connected to the side of said one frame and disposed directly below the second upper housing, a pair of second cavities respectively formed in the second upper and lower housings with the axes of the cavities co-axial with each other and with said rotational axis, a second pivot stud disposed in and extending between said second cavities and co-axial therewith and said housings and said second stud being relatively rotatable about said rotational axis;
   in one of said pivot means, lock-clutch means comprising mechanism on one of the housings fixedly securing the pivot stud thereto, a conical surface formed in the cavity of the other housing, a collet having a plurality of flexible fingers surrounding the stud and the respective outer peripheries of the fingers each having a conical surface facing said cavity conical surface, a threaded aperture in the collet, a control screw rotatably mounted in the other housing and connected to said control knob to be rotated thereby and having threads engaging the threads in the collet, means on the other housing to permit rotation of the control screw but to restrain axial motion thereof;
   rotation of the control screw in one direction causing the collet to move axially so that the conical surfaces of the fingers engage the cavity conical surface to cause the fingers to move against the stud to engage and grip the same and thereby restrain rotation of the inner frame and rotation of the control screw in the opposite direction causing the collet to move axially so that the fingers disengage from the cavity conical surface and relieve the grip on the stud;
   the rotary position of said control knob controlling the force of said engagement between the fingers and the stud to cause said lock-clutch means to hold the inner frame in a desired position and thereby function as a lock or hold the inner frame in a desired position while providing for rotation of the inner frame upon an impact on the same and thereby function as a clutch; and
   thrust bearing means surrounding one of said studs and disposed between and engaging the housings to transfer thrust therebetween.

2. A vent window comprising;
   a closed, annular-shaped outer frame having means for mounting the assembly in the body of the vehicle, the annular shape forming an opening;
   continuous seal means made of resilient material disposed within and extending around the opening, the seal being connected to the outer frame;
   an annular shaped inner frame disposed within said opening with the outer periphery of the inner frame engaging said seal means and the inner frame mounting a window;
   first and second pivot means one disposed above the other and respectively connected between the inner and outer frames on the sides thereof and mounting the inner frame on the outer frame for rotation about a generally vertical axis as between open and closed positions, the rotational axis being laterally spaced from said seal means;
   a control knob rotatably mounted on one of said pivot means and laterally spaced from said frames and seal means whereby to be freely accessible to the vehicle operator for manual rotation thereby to control rotation of the inner frame;
   in said one pivot means a stud co-axial with said rotational axis and fixedly connected to one of said frames, movable gripping means surrounding said stud and connected with the other of said frames and with said control knob and mechanism connected with said control knob and with said gripping means to cause said gripping means to move against the stud and exert a gripping force on the stud and also to move away from the stud to relieve said gripping force as a function of the rotary position of said control knob for controlling rotation of the inner frame; and
   rotation of the control knob in one direction causing the gripping means to relieve said gripping force to permit rotation of the inner frame and rotation in the opposite direction causing the gripping means to exert said force to hold the inner frame in a desired position and thereby function as a lock or to exert said force to hold the inner frame in a desired position while providing for rotation of the inner frame upon an impact on the same and thereby function as a clutch.

3. A vent window assembly having an outer frame for mounting the assembly in a vehicle and inner frame means supporting a piece of glass, a pivot mechanism comprising:
- a first housing connected to one of said frames and formed with a slide surface and an alignment stud projectiing outwardly from the slide surface;
- a first pivot block slideably mounted on slide surface, the block having an alignment cavity receiving said stud, the stud making a snug sliding fit therewith and the stud and the cavity providing for the block to rotatably slide on the surface and the first block also being formed with a pivot bore;
- a set screw in the first pivot block and engaging said stud and being for use in locking the block to prevent said rotation and for loosening the block to permit said rotation;
- a second housing connected to the other of said frames and formed with a second slide surface and a second alignment stud projecting outwardly from the second slide surface;
- a second pivot block slideably mounted on the second slide surface, the block having a second alignment cavity receiving said second stud, the stud making a snug sliding fit therewith and the stud and the cavity providing for the block to rotatably slide on the second slide surface and the second block also being formed with a pivot bore, the axes of the pivot bores being co-axial;
- a set screw mounted in said second pivot block and engaging said second alignment stud and being for use in locking the second block to prevent said rotation and for loosening the block to permit said rotation;
- a pivot having a pair of end sections respectively extending into said pivot bores; and
- spacer means surrounding said pivot and disposed between and engaging said housings to transfer thrust between the housings and permit relative rotation of the housing.

4. A vent window assembly comprising:
- an annular shaped outer frame having means for mounting the assembly in a vehicle, the annular shape forming an opening:
- glass means providing the window of the assembly;
- inner frame means mounting the glass means;
- first and second pivot means one disposed above the other, each pivot means including a pair of housings one disposed above the other and one of the housings of each pair being connected to the outer frame and the other housing connected to the inner frame means and the first and second pivot means supporting the glass on the outer frame for rotation about an axis as between a closed position wherein the glass is within said opening to any of a plurality of open positions, the rotational axis being laterally spaced from said outer frame;
- continuous seal means made of resilient material disposed within and extending around the opening, the seal being connected to the outer frame;
- a control knob rotatably mounted on one of said pivot means and laterally spaced from said outer frame and said glass whereby to be freely accessible to the vehicle operator for manual rotation to thereby control rotation of the glass;
- in said one pivot means, a stud co-axial with said rotational axis and fixedly connected with one of the housings of said one pivot means, moveable gripping means surrounding said stud and connected with the other of the housings of said one pivot means and also connected with said control knob and mechanism connected with said control knob and with said gripping means to cause said gripping means to move against the stud and exert a gripping force on the stud and also to move away from the stud to relieve said gripping force as a function of the rotary position of said control knob for controlling rotation of the glass; and
- rotation of the control knob in one direction causing the gripping means to relieve said gripping force to permit rotation of the glass and rotation in the opposite direction causing the gripping means to exert said force to hold the glass in a desired position and thereby function as a lock or to exert said force to hold the glass in a desired position while providing for rotation of the glass upon an impact on the same and thereby function as a clutch.

* * * * *